United States Patent
Hirata (10) Patent No.: US 9,757,787 B2
(45) Date of Patent: Sep. 12, 2017

(54) METAL PLATE STAMPING METHOD AND STAMPING APPARATUS

(71) Applicant: TOYOTA BOSHOKU KABUSHIKI KAISHA, Aichi-ken (JP)

(72) Inventor: Kazuyuki Hirata, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 198 days.

(21) Appl. No.: 14/636,616

(22) Filed: Mar. 3, 2015

(65) Prior Publication Data

US 2015/0266078 A1 Sep. 24, 2015

(30) Foreign Application Priority Data

Mar. 19, 2014 (JP) ................. 2014-056544

(51) Int. Cl.
| | | |
|---|---|---|
| *B21D 13/02* | (2006.01) | |
| *B21D 35/00* | (2006.01) | |
| *B21D 22/04* | (2006.01) | |
| *B21D 28/02* | (2006.01) | |
| *B21D 13/10* | (2006.01) | |
| *B21D 22/06* | (2006.01) | |

(Continued)

(52) U.S. Cl.
CPC .......... *B21D 35/001* (2013.01); *B21D 13/02* (2013.01); *B21D 13/10* (2013.01); *B21D 22/04* (2013.01); *B21D 22/06* (2013.01); *B21D 28/02* (2013.01); *B21D 53/00* (2013.01); *H01M 8/0202* (2013.01); *H01M 8/0206* (2013.01); *H01M 8/0254* (2013.01)

(58) Field of Classification Search
CPC ........ B21D 22/02; B21D 22/04; B21D 22/06; B21D 22/20; B21D 22/22; B21D 22/30; B21D 28/02; B21D 35/001; B21D 24/04; B21D 24/06; B21D 24/16; B21D 13/02; H01M 8/0254
See application file for complete search history.

(56) References Cited

U.S. PATENT DOCUMENTS 5,174,146 A * 12/1992 Heurteboust ........ B21D 51/383
72/348
5,333,482 A * 8/1994 Dunlap ................. B21D 13/00
226/166

(Continued)

FOREIGN PATENT DOCUMENTS

| EP | 2608299 | 6/2013 | |
|---|---|---|---|
| JP | 63-16819 A * | 1/1988 | ............. B21D 24/04 |

(Continued)

OTHER PUBLICATIONS

Translation, SU 1754277 A1, Aug. 15, 1992.*

(Continued)

*Primary Examiner* — Edward Tolan
(74) *Attorney, Agent, or Firm* — Greenblum & Bernstein, P.L.C.

(57) ABSTRACT

A metal plate stamping method is provided for cutting a metal plate, on which a bulging portion is formed through stamping, at a cutting area that is defined in a portion other than the bulging portion. The method includes forming a bead on the opposite side of the cutting area from the bulging portion and crushing the bead prior to the cutting of the metal plate.

4 Claims, 7 Drawing Sheets

(51) Int. Cl.
*B21D 53/00* (2006.01)
*H01M 8/0202* (2016.01)
*H01M 8/0206* (2016.01)
*H01M 8/0254* (2016.01)

(56) References Cited

U.S. PATENT DOCUMENTS

| | | | | |
|---|---|---|---|---|
| 5,632,180 A * | 5/1997 | Doose | ............... | B21D 13/02 |
| | | | | 72/379.6 |
| 5,901,599 A * | 5/1999 | Sato | ............... | B21D 24/04 |
| | | | | 72/350 |
| 6,276,185 B1 * | 8/2001 | Owens | ............... | B21D 22/22 |
| | | | | 72/350 |
| 7,234,336 B2 * | 6/2007 | Braun | ............... | B21D 22/02 |
| | | | | 72/379.6 |
| 2008/0184764 A1 * | 8/2008 | Nakamura | ............... | B21D 25/04 |
| | | | | 72/350 |
| 2012/0318034 A1 * | 12/2012 | Moore | ............... | B21D 22/06 |
| | | | | 72/338 |
| 2013/0186163 A1 | 7/2013 | Schlatter | | |

FOREIGN PATENT DOCUMENTS

| | | | | |
|---|---|---|---|---|
| JP | 2004-291005 | * 10/2004 | ............ | B21D 24/04 |
| JP | 2009-255106 | 11/2009 | | |
| JP | 2013-27912 | 2/2013 | | |
| SU | 1754277 A1 * | 8/1992 | ............ | B21D 22/02 |

OTHER PUBLICATIONS

Office Action issued in Germany Counterpart Patent Appl. No. 102015103924.9, dated Jul. 12, 2016, along with an English translation thereof.

* cited by examiner

METAL PLATE STAMPING METHOD AND STAMPING APPARATUS

BACKGROUND OF THE INVENTION

The present invention relates to, for example, methods and apparatuses for stamping metal plates for forming separators of fuel cells.

Separators of fuel cells are formed of metal plates. A separator has, at its center, bulging portions, which correspond to a sealing portion and a flow passage for fuel gas or oxidation gas. The bulging portions are typically formed through stamping. The metal plate thus has residual stress after stamping. The residual stress can result in changes in the shape or the size of the metal plate when the metal plate is sheared into a predetermined shape after stamping. This can lower dimensional accuracy.

Japanese Laid-Open Patent Publication No. 2009-255106 discloses a technique for producing an embossed intermediate product. The embossed part is flattened to reduce stress that would otherwise cause warpage of the intermediate product.

Japanese Laid-Open Patent Publication No. 2013-27912 discloses a technique that forms beads on the bottom wall of a hat-shaped product to reduce spring back.

According to the technique disclosed in Japanese Laid-Open Patent Publication No. 2009-255106, traces of embossing are difficult to erase after the embossed parts in the intermediate product are flattened. The technique is not suitable for products that require high dimensional accuracy such as separators of fuel cells.

According to the technique disclosed in Japanese Laid-Open Patent Publication No. 2013-27912, the beads are not flattened after the product is finished and thus remain in the product. Therefore, as in the above case, the technique is not suitable for products that require high dimensional accuracy such as separators of fuel cells.

SUMMARY OF THE INVENTION

Accordingly, it is an objective of the present invention to provide a stamping method and a stamping apparatus that are capable of performing highly accurate processing on metal plates.

To achieve the foregoing objective and in accordance with a first aspect of the present invention, a metal plate stamping method is provided that is employed for cutting a metal plate, on which a bulging portion is formed through stamping, at a cutting area that is defined in a portion other than the bulging portion. The method includes: forming a bead on the opposite side of the cutting area from the bulging portion; and crushing the bead prior to the cutting of the metal plate.

According to this stamping method, the bead is crushed prior to cutting of the metal plate. This reduces the residual stress in the metal plate and particularly improves the dimensional accuracy of the product obtained by cutting the metal plate. Further, since the cutting of the metal plate does not leave the bead in the finished product, the dimensional accuracy of the product is further improved, and undesirable unevenness is not formed in the product.

In accordance with a second aspect of the present invention, a stamping apparatus is provided that includes a die member for shearing a metal plate and a punch. The apparatus further includes a crushing portion that crushes, prior to the shearing, a bead formed on the metal plate. This stamping apparatus improves the dimensional accuracy of the product.

DETAILED DESCRIPTION OF THE PREFERRED EMBODIMENTS

A metal plate stamping method and stamping apparatus according to one embodiment will now be described. In the present embodiment, the metal plate stamping method and stamping apparatus produce a fuel cell separator, which is one example of a product. The separator is made of, for example, a titanium alloy or stainless steel.

First, the overall configuration of a manufacture procedure will be described with reference to FIGS. 1 to 9.

Figure 1:
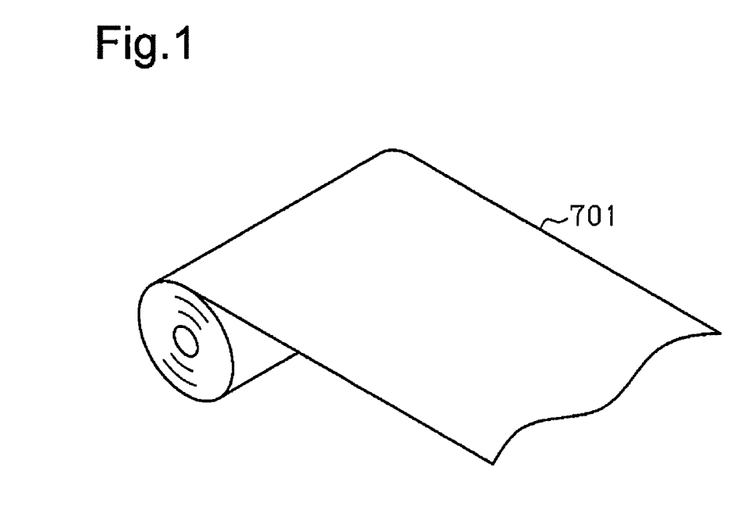
FIG. 1 is a perspective view illustrating hoop material.
Figure 2:
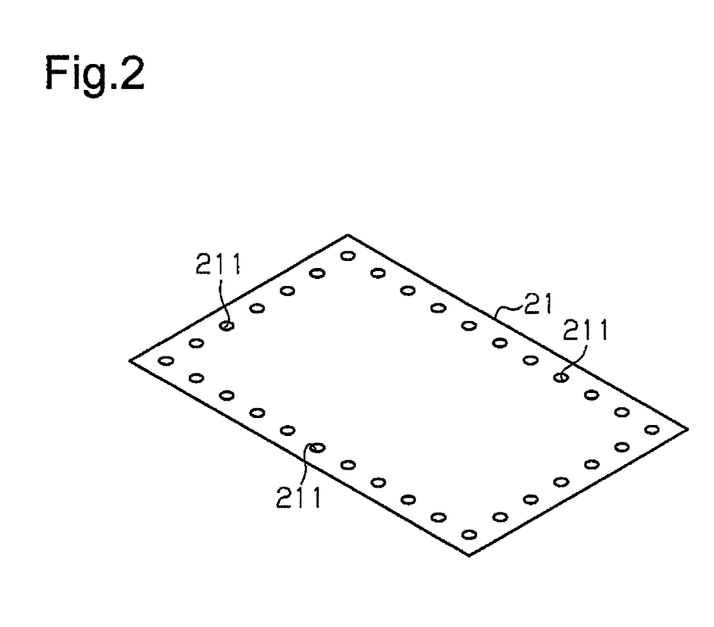
FIG. 2 is a perspective view illustrating a metal plate.

As shown in FIG. 1, metal hoop material 701 is sheared to obtain a workpiece, which is a rectangular metal plate 21 shown in FIG. 2. Through holes 211 are formed in the outer peripheral portion of the metal plate 21.

Figure 3:
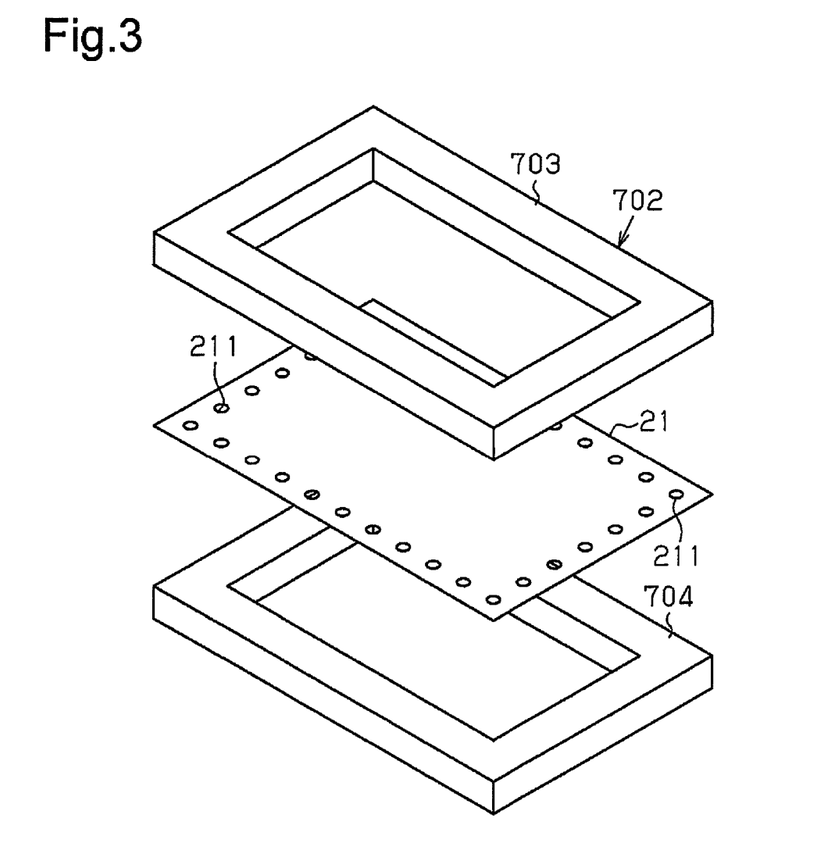
FIG. 3 is an exploded perspective view illustrating the metal plate and a frame.
Figure 4:
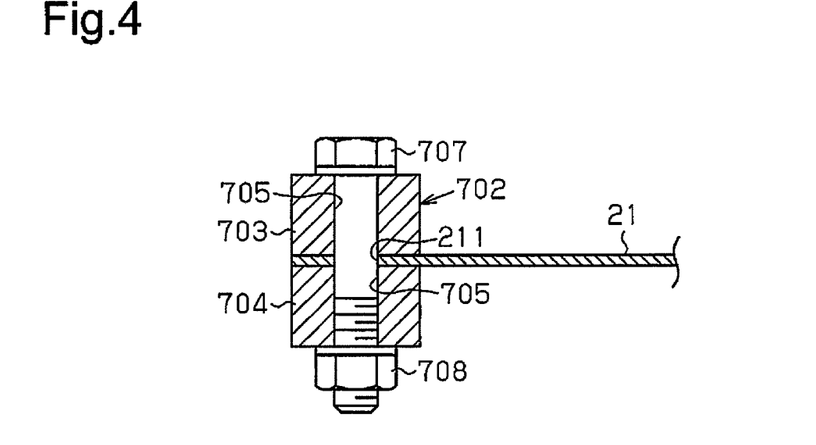
FIG. 4 is a partial cross-sectional view illustrating the metal plate and the frame.

As shown in FIGS. 3 and 4, the peripheral portion of the metal plate 21 is clamped between frame members 703, 704 of a rectangular loop-shaped frame 702. Bolts 707 are inserted into through holes 705 of the frame members 703, 704 and through holes 211 of the metal plate 21, and nuts 708 are threaded to the bolts 707, so that the metal plate 21 is clamped to the frame 702.

Figure 5:
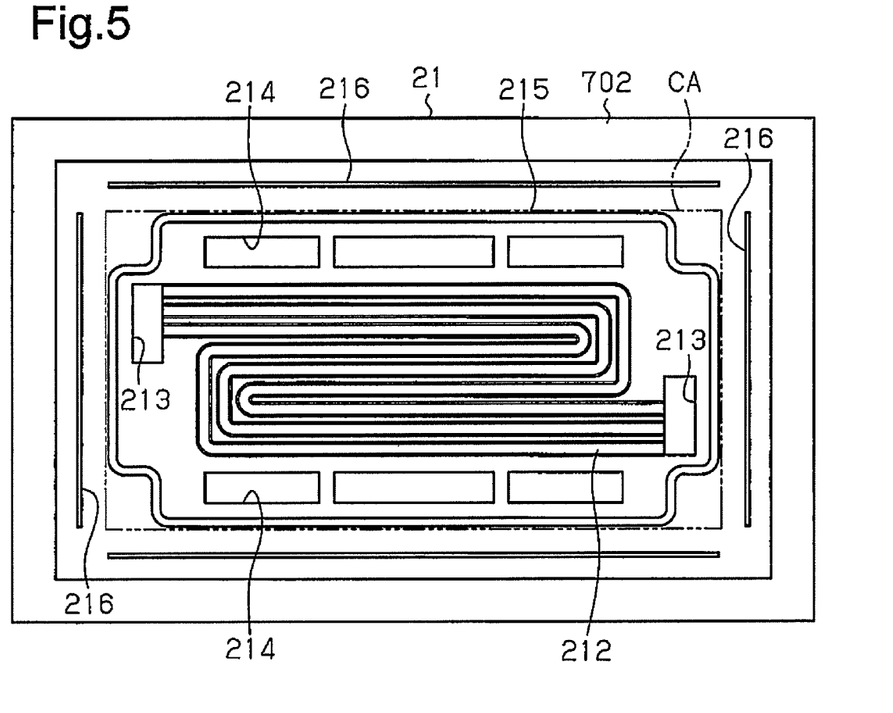
FIG. 5 is a plan view illustrating the metal plate to which the frame is attached.

Thereafter, as shown in FIG. 5, a meandering gas passage 212, openings 213, 214, a looped sealing portion 215, and beads 216 are formed on the metal plate 21. The gas passage 212 is located in a center portion of the metal plate 21. The openings 213, 214 are located about the gas passage 212. The looped sealing portion 215 is formed by a protrusion and located outside the openings 213, 214. The beads 216 are located in a looped area surrounding the sealing portion 215. The metal plate 21 is sheared at cutting area CA located between the beads 216 and the sealing portion 215 to obtain a separators 30 illustrated in FIG. 6. The gas passage 212 and the sealing portion 215 form bulging portions.

Figure 7:
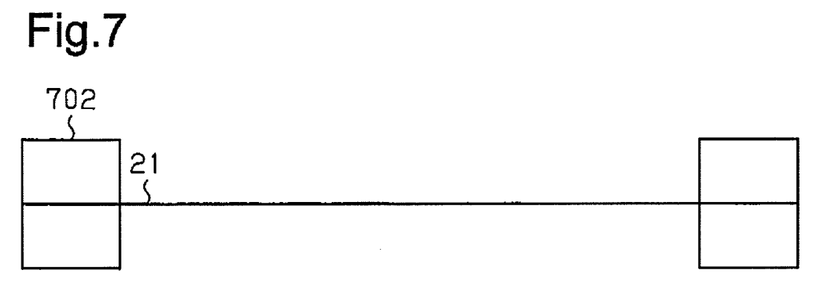
FIG. 7 is a schematic diagram showing a state in which the frame is attached to the metal plate.
Figure 8:
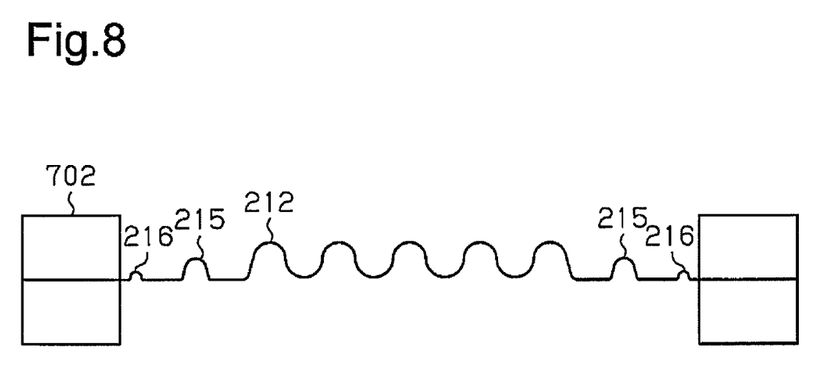
FIG. 8 is a schematic diagram showing the metal plate after bulging portions are formed.
Figure 9:
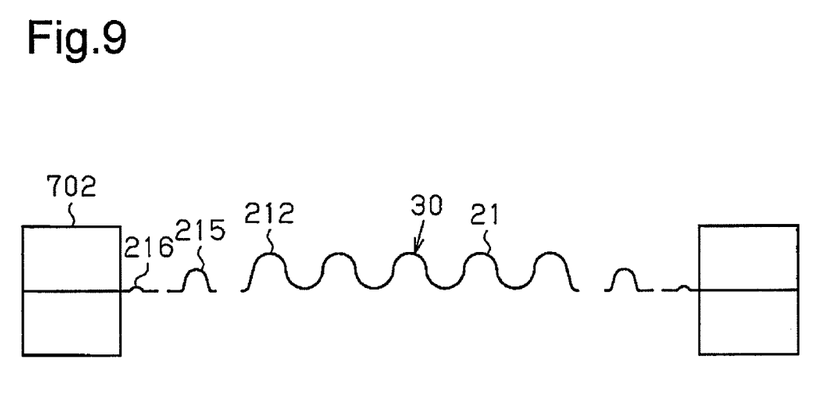
FIG. 9 is a schematic diagram showing the metal plate after being sheared.

After being attached to the frame 702 as shown in FIG. 7, the metal plate 21 is processed in the following manner as illustrated in FIGS. 7 to 9.

First, as shown in FIG. 8, the gas passage 212 is formed by bulging. Also, the sealing portion 215 and the beads 216 are formed on the outer side of the gas passage 212. In the present embodiment, the bulging portions, which are formed by the gas passage 212 and the sealing portion 215, and the beads 216 are formed simultaneously.

Then, as shown in FIG. 9, the openings 213, 214 are formed by shearing, and the part between the sealing portion 215 and the beads 216 are sheared, so that the separator 30 is formed through stamping.

As long as the openings 213, 214, the sealing portion 215, and the beads 216 are formed before the separator 30 is formed by shearing, the openings 213, 214, the sealing portion 215, and the beads 216 may be formed simultaneously with, before, or after the formation of the gas passage 212.

The stamping procedure and the stamping apparatus 50 used in the forming procedure will now be described.

First, the stamping apparatus 50 will be described. The stamping apparatus 50 is substantially bilaterally symmetric, and the left half of the stamping apparatus 50 is shown in FIG. 10.

Figure 10:
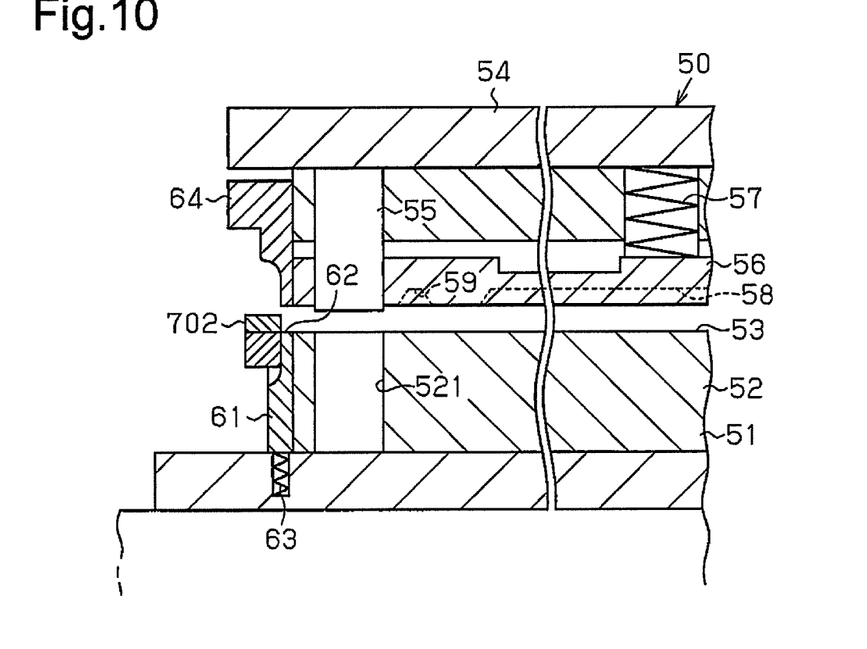
FIG. 10 is a cross-sectional view illustrating a stamping apparatus before the metal plate is sheared and the beads are crushed.
Figure 11:
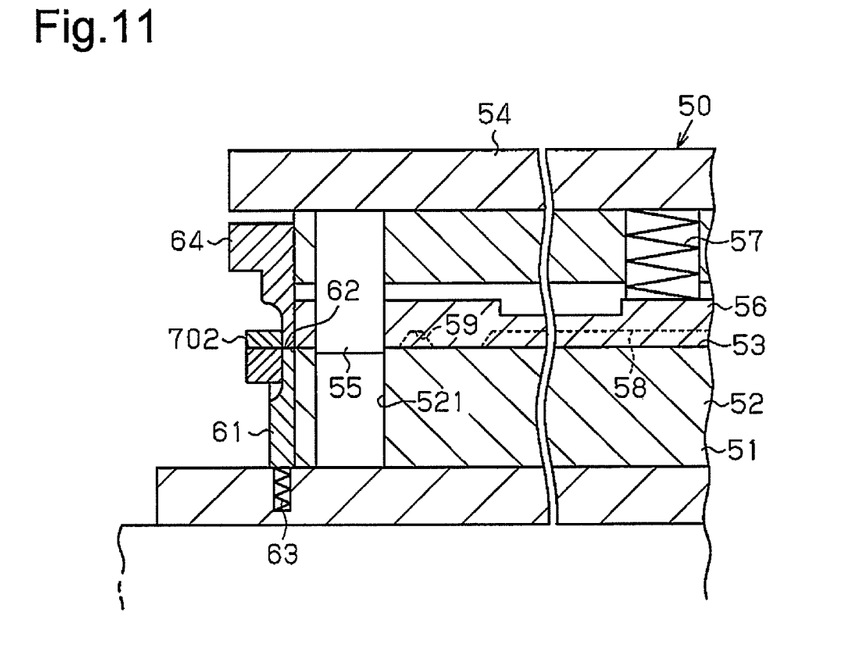
FIG. 11 is a cross-sectional view illustrating the stamping apparatus when the metal plate is sheared and the beads are crushed.

As shown in FIG. 10, the stamping apparatus 50 includes a fixed lower die 51, an upper die 54, which is lifted and lowered in relation to the lower die 51, an ejector 61 located on the outer side of the lower die 51, and a crush die 64 located on the outer side of the upper die 54. The lower die 51 has a die member 52, which has a mounting surface 53 on the upper surface, on which the metal plate 21 is mounted. A stamping hole 521 is formed in the mounting surface 53. The stamping hole 521 has a looped shape.

The upper die 54 has a looped punch 55, which faces the stamping hole 521. The upper die 54 has, on the lower side, a holding member 56, which is lifted and lowered within a predetermined range. The holding member 56 is urged downward by a spring 57. The holding member 56 has, on the lower surface, recesses 58, 59, which correspond to and receive the gas passage 212 and the sealing portion 215 of the metal plate 21, respectively.

The ejector 61, which can be lifted and lowered, is arranged on the outer side of the lower die 51. The upper surface of the ejector 61 forms a receiving surface 62. The ejector 61 is urged upward by a spring 63. The crush die 64 is fixed to the outer periphery of the upper die 54 and located above the ejector 61. As the upper die 54 is lowered, the crush die 64 applies crushing pressure onto the metal plate 21 on the receiving surface 62. The ejector 61 and the crush die 64 form a crushing portion.

Figure 12:
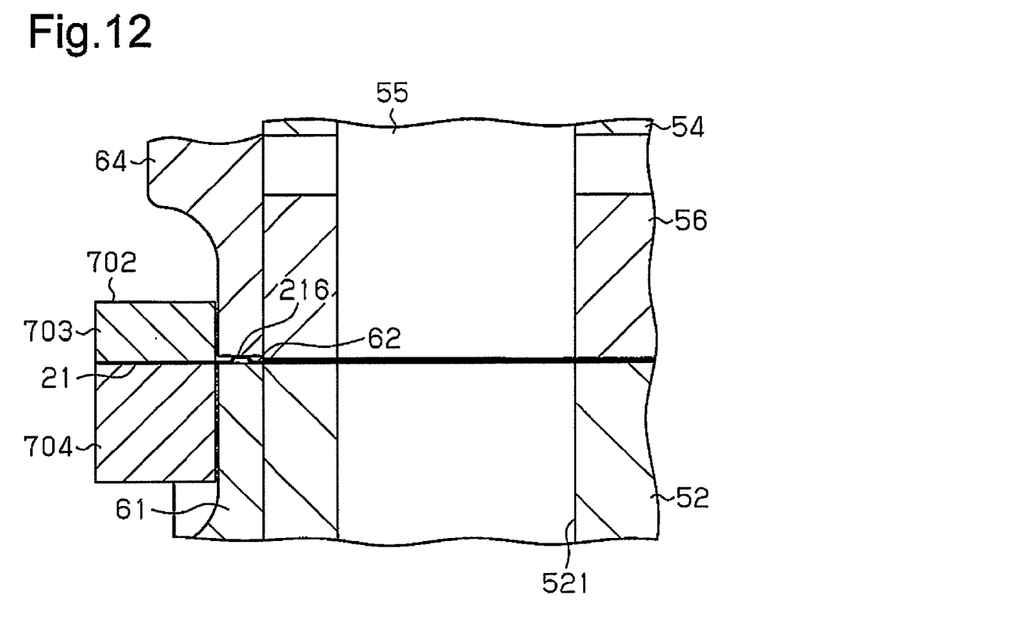
FIG. 12 is an enlarged cross-sectional view illustrating the stamping apparatus before the metal plate is sheared.

A stamping process performed by the stamping apparatus 50 will now be described. As described above, the stamping apparatus 50 crushes the beads 216 and cuts the metal plate 21. Specifically, when the upper die 54 is at the lifted position as shown in FIG. 10, the metal plate 21 is placed between the lower die 51 and the upper die 54. At this time, as shown in FIG. 12, the beads 216 of the metal plate 21 are located on the receiving surface 62 of the ejector 61, and the stamping hole 521 of the die member 52 and the punch 55 correspond to the section between the beads 216 and the sealing portion 215 in the metal plate 21.

Figure 13:
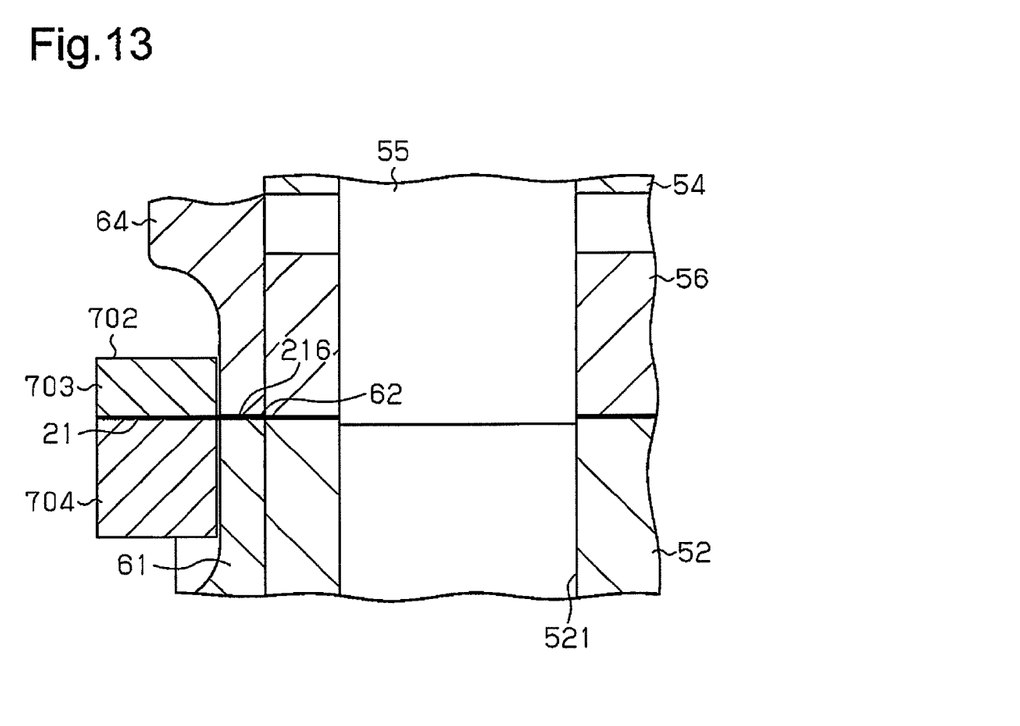
FIG. 13 is an enlarged cross-sectional view illustrating the stamping apparatus when the metal plate is sheared and the beads are crushed.
Figure 14:
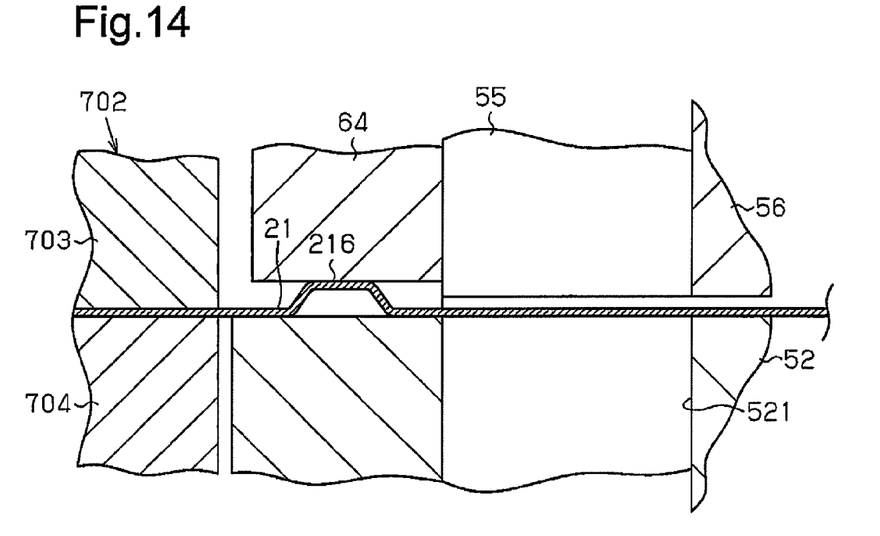
FIG. 14 is an enlarged cross-sectional view illustrating a bead portion before the metal plate is sheared.
Figure 15:
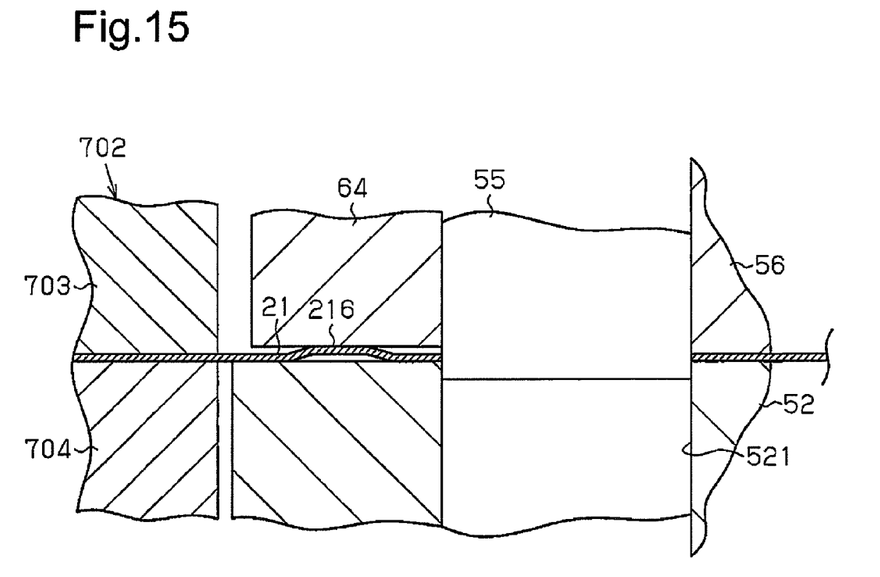
FIG. 15 is an enlarged cross-sectional view illustrating the bead portion when the metal plate is sheared.

Then, as shown in FIGS. 13, 14, and 15, the upper die 54 is lowered together with the crush die 64. Accordingly, the crush die 64 contacts the upper surfaces of the beads 216, which are supported by the receiving surface 62 of the ejector 61 from below. As the crush die 64 is further lowered, so that the beads 216 are crushed between the crush die 64 and the ejector 61. This reduces the residual stress that is generated in the metal plate by the formation of the bulging portions, which include the gas passage 212 and the sealing portion 215.

Figure 6:
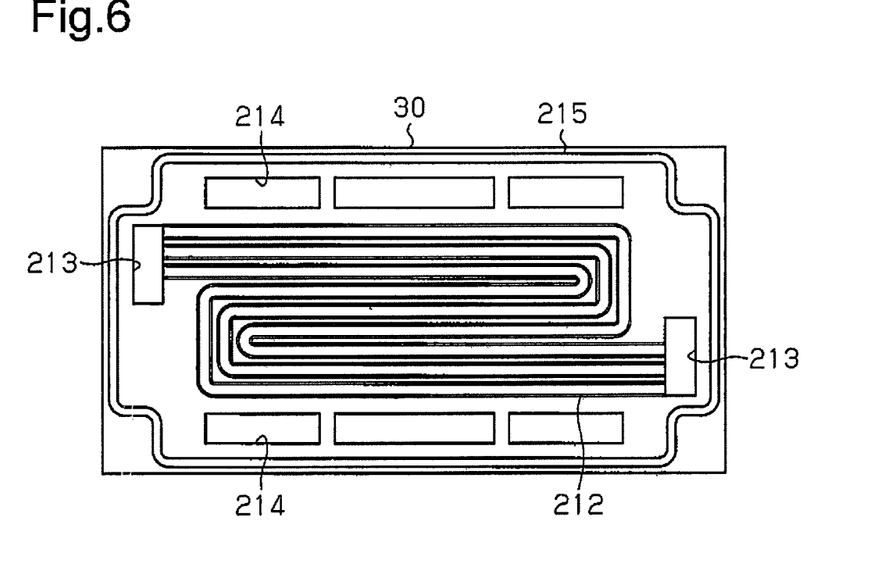
FIG. 6 is a plan view illustrating a separator.

Immediately before the end of the crushing operation by the crush die 64, that is, when the reduction of the residual stress is substantially ended, the die member 52 and the punch 55 shear the metal plate 21 at the cutting area CA between the beads 216 and the sealing portion 215 illustrated in FIG. 5. Through the shearing, the separator 30 shown in FIG. 6 is stamped out. Although the cutting area CA has a certain width, it is represented by the long dashed double-short dashed line in FIG. 5 for the illustrative purposes.

Although not illustrated, the openings 213, 214 are formed through shearing simultaneously with the shearing for forming the separator 30. However, the opening 213, 214 may be formed at any time before the separator 30 is formed by the die member 52 and the punch 55.

Thereafter, the separator 30 is delivered to the next process for assembling a fuel cell. After being separated from the remnants of the metal plate 21, the frame members 703, 704 are used again for forming succeeding separators 30.

This embodiment achieves the following advantages.

(1) The sealing portion 215 and the gas passage 212 are formed on the inner side of the rectangular and looped cutting area CA on the metal plate 21, in other words, on the inner side of the shearing position, and the beads 216 are formed on the outer side of this shearing position. The beads 216 are crushed before the metal plate 21 is sheared. This pushes the material in the parts corresponding to the beads 216 in the metal plate 21 toward the sealing portion 215 and the gas passage 212. Thus, even if the residual stress in the tensile direction is generated by the formation of the sealing portion 215 and the gas passage 212, the residual stress is reduced. This restrains changes in dimensions of the separator 30 after being stamped out from the metal plate 21. That is, the dimension accuracy is improved.

(2) The beads 216 are formed to surround the sealing portion 215 and the gas passage 212, and the metal plate 21 is sheared in the cutting area CA between the beads 216 and the sealing portion 215, which is on the outer side of the gas passage 212. This reduces the stress in the entire metal plate 21.

(3) Since metal plate 21 is sheared when the crushing of the beads 216 is ended, the stress in the metal plate 21 is reliably released.

(4) On the metal plate 21, the shearing position, that is, the cutting area CA is located on the inner side of the beads 216. Thus, the part of the beads 216 is separated from the separator 30 to become a remnant when the metal plate 21 sheared. The separator 30 is thus formed without the crushed beads 216. Therefore, undesired unevenness is not formed on the metal plate 21, and a separator having high dimensional accuracy is formed.

Modifications

In the above described embodiment, the beads 216 are separated from each other and form a loop-like shape. Instead, a single bead 216 having a loop-like shape may be formed on the metal plate 21.

The positions of the punch 55 and the die member 52 may be reversed. In this case, the recesses 58, 59 for receiving the sealing portion 215 and the gas passage 212 are formed in the lower die 51.

The separator 30 may be cut out of the metal plate 21, for example, by laser cutting.

The invention claimed is:

1. A metal plate stamping method for cutting a metal plate, on which a bulging portion is formed through stamping, at a cutting area of the metal plate that is defined in a portion other than the bulging portion, the method comprising:
   providing the bulging portion with a sealing portion that is formed on the metal plate;
   forming a bead on the metal plate and on an opposite side of the cutting area from the sealing portion, wherein the bead surrounds the sealing portion; and
   crushing the bead prior to the cutting of the metal plate, and
   cutting the metal plate at the cutting area that is located between the crushed bead and the sealing portion.

2. The metal plate stamping method according to claim 1, wherein
   the sealing portion and the cutting area is formed to have a looped shape.

3. The metal plate stamping method according to claim 1, wherein, when the crushing of the bead is finished, the metal plate is cut through shearing.

4. A stamping apparatus, comprising:
   a die member configured to shear a metal plate;
   a punch that cooperates with the die to shear the metal plate, wherein the die member and the punch are each formed to have a looped shape; and
   a crushing portion that is configured to crush, prior to the shearing, a bead formed on the metal plate,
   the crushing portion including a crush die and an ejector, wherein the ejector is configured to be lifted and lowered and urged upwardly by a biasing member so as to crush the bead between opposing surfaces of the crush die and the ejector, and
   wherein the crushing portion is formed on the outer side of the die member and the punch.

* * * * *